358-218. OR 3,647,952 SR

United States Patent

Ball et al.

[15] 3,647,952

[45] Mar. 7, 1972

[54] AUTOMATIC BEAM-FOCUSING SYSTEM

[72] Inventors: Henry Ball, Princeton, N.J.; Harold LeRoy Peterson, Los Angeles, Calif.

[73] Assignee: RCA Corporation

[22] Filed: Apr. 15, 1970

[21] Appl. No.: 28,647

[52] U.S. Cl. .......... 178/7.2

[51] Int. Cl. .......... H04n 5/34

[58] Field of Search .......... 178/7.2, 7.2 E, 5.4; 315/31

[56] References Cited

UNITED STATES PATENTS 3,509,275 4/1970 Deeley et al .......... 178/7.2 E 2,939,042 5/1960 Fathauer .......... 178/7.2 E

*Primary Examiner*—Richard Murray

*Attorney*—Eugene M. Whitacre

[57] ABSTRACT

A modulating component is added to a beam-focusing parameter such as a focusing electrode potential or a focusing parameter such as a focusing electrode potential or a focusing coil current utilized in conjunction with an image pickup device. A modulation component derived from a video output terminal of the image pickup device is detected and utilized for providing a beam-focusing error correction signal which controls the beam-focusing parameter.

7 Claims, 3 Drawing Figures

T5142

INVENTORS
HENRY BALL &
BY HAROLD L. PETERSON
Eugene M. Whitacre
Attorney

AUTOMATIC BEAM-FOCUSING SYSTEM

BACKGROUND OF THE INVENTION

This invention relates to a system for automatically focusing an electron beam of an image pickup device. It is recognized that to achieve the highest resolution of images focused onto an image pickup device the scanning beam should be in focus at the scanned electrode at all times. An out-of-focus beam will not resolve the detail in an image and the higher frequency video components representing this detail will not be of the correct amplitude. Hence, the reproduced image of a scene in a television receiver, for example, will not be representative of the original scene. In those cases in which an image pickup device is utilized for producing encoded color representative signals, an out-of-focus condition will result in lack of uniformity of color and may produce colorimetry errors.

Focus control of the beam in an image pickup device is usually accomplished by adjusting the potential applied to a focus electrode or adjusting the focusing magnetic field by changing the current in a focusing electromagnet. The beam may depart from an optimum focus condition due to temperature changes which effect the impedance of the focusing components or affect the regulation of the focusing electrode potentials or focusing coil current. In the operation of image pickup devices utilized, for example, in television cameras it is usual to allow a warmup period before the beam focus is adjusted. Further, it is common to utilize relatively costly power supplies for producing well-regulated electrode potentials and focusing coil current. Nonetheless, an out-of-focus condition may still occur under those circumstances which bring about temperature changes of the focusing components such as occurs when a television camera is moved from an indoor to an outdoor location or vice versa. Also, it is desirable to have the beam remain in focus when a camera is left unattended and subject to temperature changes over a relatively long period of time, such as may be encountered when a camera is utilized for surveillance purposes.

It is an object of this invention to provide a system for automatically focusing an electron beam of an image pickup device.

Another object of this invention is to provide a system for automatically focusing an electron beam of an image pickup device, which system imposes less stringent requirements on the regulation of the focus voltage and current supplies.

Apparatus is provided for automatically focusing an electron beam of an image pickup device. A modulation component is added to a focusing parameter such as a focusing electrode potential or a focusing coil current. Means coupled to a signal electrode of the image pickup device detect perturbations caused by the modulated focusing parameter. The detected perturbations are coupled to means for producing a control signal having a sense related to an out-of-focus condition of the electron beam. The control signal is coupled to means for altering a focusing parameter for focusing the beam.

A more detailed description of the invention is given in the following specification and accompanying drawings of which:

FIGS. 3*a* to 3*e* illustrate waveforms obtained at various points in the system shown in FIG. 1.

DESCRIPTION OF THE INVENTION

Figures 1, 2, 3:
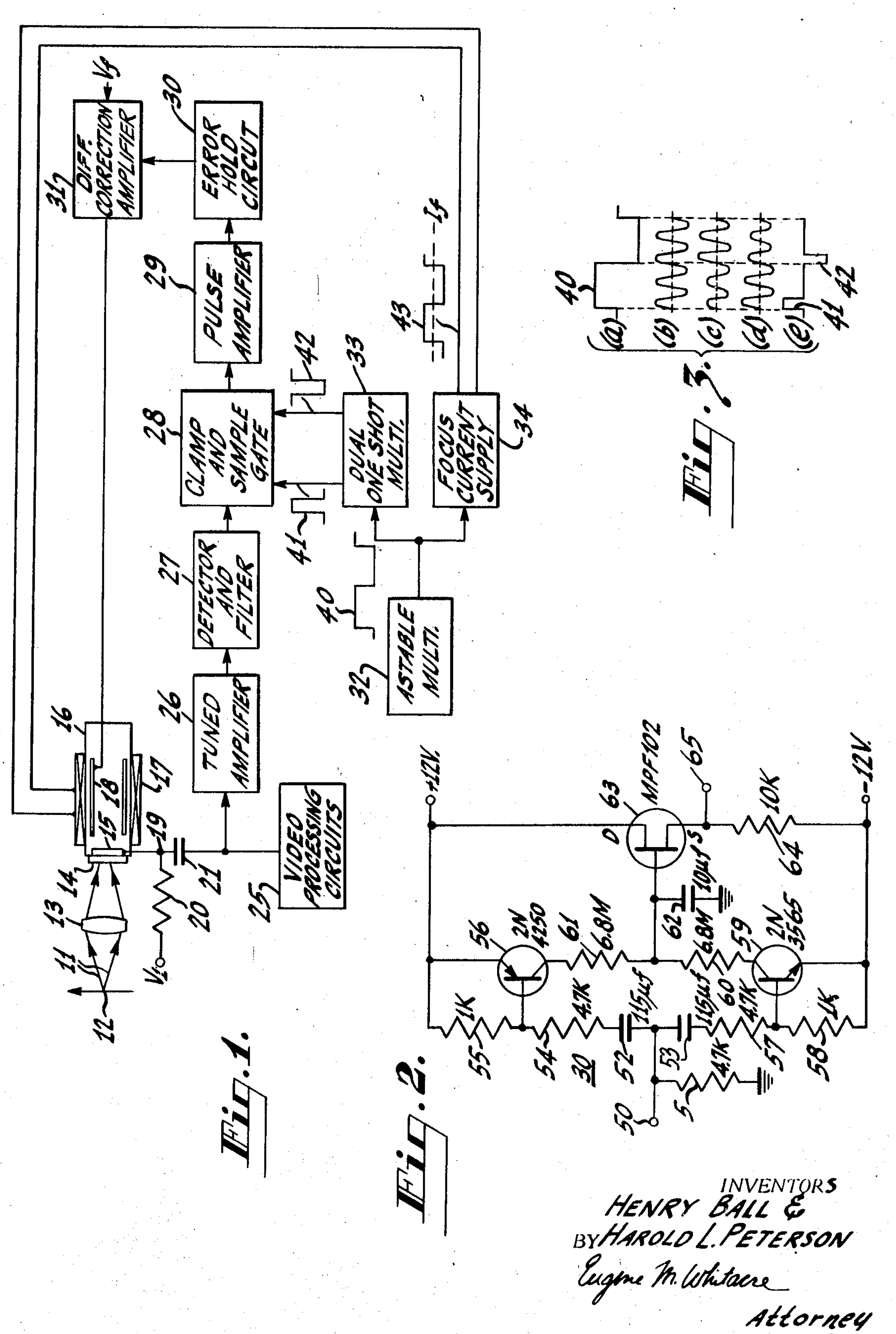
FIG. 1 is a functional block diagram of a television camera including an automatic beam-focusing system embodying the invention.
FIG. 2 is a schematic diagram of a circuit which may be utilized in the system shown in FIG. 1.

FIG. 1 is a functional block diagram of a television camera including an automatic beam-focusing system embodying the invention. Light rays 11 from an object 12 are focused by an objective lens 13 through a striped spatial color encoding filter 14 onto a photosensitive electrode 15 of an image pickup device 16. Image pickup device 16 may be of the vidicon type, for example, and operated in a conventional manner. Image pickup device 16 has within its glass envelope a ring focusing electrode 18. A focusing electromagnet including a focusing coil assembly 17 is disposed around the outside of image pickup device 16. The combination of the electric field produced by focusing ring 18 and the magnetic field produced by focusing coil assembly 17 produces a total field for focusing the electron beam of image pickup device 16 at the scanned photosensitive electrode 15. In the embodiment shown, the electron beam of image pickup device 16 is caused to scan across photosensitive electrode 15 at conventional television line and field scanning rates by conventional electron beam deflection apparatus, not shown in the drawings.

Photosensitive electrode 15, which is a target electrode in a vidicon image pickup device, is coupled to a terminal 19 which is the junction between a load resistor 20 and a coupling capacitor 21. Load resistor 20 is coupled between terminal 19 and a source of operating potential $V_1$. Video signals developed across load resistor 20 are coupled to a tuned amplifier 26 and video-processing circuits 25.

The system shown in FIG. 1 is a single-tube color encoding camera. Spatial encoding filter assembly 14 comprises superimposed color-encoding gratings each having a pattern of alternate transparent and colored stripes for encoding scene light of different colors as amplitude modulation of two spatial frequencies. The encoding gratings may be such as to encode red and blue light as modulation of two carrier waves of approximately 3.5 MHz. and 5 MHz. respectively derived from photosensitive electrode 15 as it is scanned by the electron beam. The composite signal including the two-color representative carrier wave components and their sidebands are processed by video-processing circuits 25 for producing separate color representative signals. A detailed description of the video-processing circuits is omitted because the operation of these circuits is not necessary for an understanding of the invention.

Tuned amplifier 26 comprises an amplifying stage tuned to have peak responses at the color representative carrier wave frequencies of 3.5 and 5 MHz. The signals obtained from tuned amplifier 26 are coupled to a detector and filter circuit 27. Detector and filter circuit 27 demodulates the carrier wave signals and smoothes them for obtaining an average signal. The detected signal is coupled to a clamp and sample gate circuit 28 in which the incoming signal is clamped at a reference potential established during the time a clamp pulse 41 is coupled to the clamp stage. The clamped signal is coupled to a sample gate stage and is sampled during the interval of a sample gate pulse 42. The signal obtained from clamp and sample gate circuit 28 has a polarity determined by the polarity of the signal obtained from detector and filter circuit 27.

FIGS. 3*a* to 3*e* show waveforms obtained at various places in the system shown in FIG. 1. FIGS. 3*a* to 3*e* are connected vertically by dotted lines to show the timing relationship between the waveforms. FIG. 3*a* shows a waveform 40 which is utilized to modulate the focus current and to trigger dual one-shot multivibrator 33. FIG. 3*b* illustrates a carrier wave obtained from tuned amplifier 26 when the focusing voltage is such that the electron beam is in focus. In this situation both the positive and negative modulation components of the focus current deviate the same slight amount from the optimum focus condition and the carrier wave is the same amplitude for the entire modulation cycle. FIGS. 3*c* and 3*d* illustrate a carrier wave signal when the focusing voltage is too high and too low, respectively. Thus, in FIG. 3*c* the carrier wave obtained during the positive portion of the modulation cycle is reduced in amplitude due to a too-high focus voltage condition and FIG. 3*d* illustrates the carrier wave signal as having a reduced amplitude during the negative portion of the modulation cycle when the focusing voltage is too low. FIG. 3*c* illustrates clamp pulse 41 and sample pulse 42 in timed relationship to waveform 40. Clamp pulse 41 serves to establish a reference for the detected carrier waves which are capacitively coupled to the clamp and sample gate 28 and which may not have a constant direct current component due to circuit element variation. Since sample gate pulse 42 occurs at the same place in each modulation cycle it can sample the detected and clamped carrier wave signal for normal, high or low focusing voltage conditions.

The signal obtained from clamp and sample gate circuit 28 is coupled to a pulse amplifier 29. The amplified signal obtained from pulse amplifier 29 is coupled to an error hold circuit 30. Error hold circuit 30 produces a continuous control signal having a polarity determined by the polarity of the pulse obtained from pulse amplifier 29. An example of an error hold circuit which may be utilized will be described subsequently in conjunction with FIG. 2.

The control signal obtained from error hold circuit 30 is coupled to an input terminal of a differential correction amplifier 31. A source of focusing electrode potential $V_F$ is coupled to another input terminal of differential amplifier 31. The control signal alters the focusing electrode potential and the altered focusing electrode potential is coupled to focusing ring electrode 18 of image pickup device 16.

An astable multivibrator 32 produces a periodic waveform 40 which is coupled to a dual one-shot multivibrator 33 and a focus current supply 34. The positive-going edge of waveform 40 produces a clamping pulse 41 from one portion of dual multivibrator 33. The period of waveform 40 is approximately 750 milliseconds and the multivibrator is selected such that the width of clamp pulse 41 is equal to 5 percent of the period of waveform 40, or approximately 37.5 milliseconds. The negative-going edge of waveform 40 is used to trigger a second portion of dual multivibrator 33 for producing a sample pulse 42. The sample pulse producing multivibrator is selected such that the width of clamp pulse 42 is approximately 37.5 milliseconds.

Waveform 40 is also coupled to a focus current supply 34 in which the waveform is utilized to amplitude modulate the focus coil current by approximately 0.5 percent of its direct current value. The periodically modulated focus coil current is represented by a waveform 43 which is shown to be symmetrical above and below a focusing current $I_F$. The modulated focusing current is coupled to focusing coil 17.

In operation, the periodic relatively low-level modulation impressed upon the focus current coupled to focus coil 17 causes a slight variation in the focus of the electron beam at the scanned photosensitive electrode 15. This relatively small variation in the focus of the beam is not noticeable on a reproduced television picture. Nonetheless, this slight variation in focus causes a slight variation in the amplitude of the signals derived from photosensitive electrode 15. The change in focus will appear as periodic amplitude changes of the signal obtained from terminal 19. Thus, the 3.5 and 5 MHz. color carrier waves obtained from tuned amplifier 26 include slight amplitude variations caused by beam focus variations. The signal variations which appear as amplitude modulation of the carrier waves are detected and smoothed by detector and filter circuit 27. The signal obtained from detector and filter 27 is thus a smoothed signal having a polarity determined by the increase or decrease in the amplitude of the carrier wave signals. The smoothed signals are clamped in clamp and sample gate circuit 28 for establishing a reference potential for the amplitude variations. The clamped and smoothed signals are then sampled during the interval of sampling pulse 42. The sampled signal having a polarity as described above is coupled to a pulse amplifier 29. The signal obtained from pulse amplifier 29 is either of positive or negative polarity, depending upon the direction of beam focus error, i.e., whether the beam focuses in front of or behind photosensitive electrode 15. Error hold circuit 30 receives the positive or negative pulses and produces a corresponding positive or negative continuous control signal from the pulses. This control signal is coupled to an input of differential correction amplifier 31 for increasing or decreasing the nominal value of focus electrode potential $V_F$ which is coupled to focusing electrode 18. The corrected focusing potential is such that it causes the beam to be properly focused at target electrode 15. Once the beam has been properly focused the modulation waveform 43 causes equal signal amplitude variations for both its positive and negative portions of its cycle. This condition indicates the beam is properly focused and no change in control voltage will be developed for further correction of the focusing electrode potential.

FIG. 2 is a schematic diagram of a circuit which may be utilized in the error hold circuit block 30 in the system shown in FIG. 1. The signal coupled to terminal 50 is the signal obtained from pulse amplifier 29 of FIG. 1, which pulse is of positive or negative polarity. This pulse is coupled to error hold circuit 30 across resistor 51 coupled between terminal 50 and ground. The signal is coupled through a capacitor 52 in series with a resistor 54 to the base of a PNP-transistor 56. The base of transistor 56 is coupled through a resistor 55 to a source of positive potential indicated as +12 volts in the diagram. Resistors 54 and 55 comprise a biasing network for transistor 56 to provide noise immunity of the stage under circumstances in which a sudden large change in scene illumination occurs, for example. The signals obtained from terminal 50 are also coupled through a capacitor 53 in series with a resistor 57 to an NPN-transistor 59. The base of transistor 59 is coupled through a resistor 58 to a source of negative potential indicated as −12 volts in the diagram. Resistors 57 and 58 bias transistor 59 in a similar manner to the biasing of transistor 56. The collector electrodes of transistors 56 and 59 are coupled through resistors 61 and 60 respectively to a gate electrode of a field effect transistor 63 operated in a common source configuration. A capacitor 62 is coupled between the gate electrode and a point of reference potential. The drain electrode of transistor 63 is coupled to the +12 volt supply and the source electrode is coupled through a load resistor 64 to the −12 volt supply. An output terminal 65 is coupled to the source electrode of transistor 63.

In operation, a positive polarity pulse coupled to terminal 50 causes transistor 59 to conduct, allowing capacitor 62 to acquire a negative charge. A pulse of negative plurality coupled to terminal 50 causes transistor 56 to conduct, charging capacitor 62 positively. The charge on capacitor 62, which is the potential applied to the gate electrode of transistor 63, controls the conduction of transistor 63 results in the control signal being developed across load resistor 64 which signal has the same polarity relative to the gate electrode potential. It should be noted that the relatively long time constant provided by the RC combination of capacitor 62 and resistor 61 or resistor 60 and the high impedance of transistors 56 and 59 when they are not conducting effectively serves to smooth the signal coupled to terminal 50 such that the focus correction control signal obtained from terminal 65 is relatively constant over a relatively long time and changes by a relatively small amount during a 750-millisecond period between sample pulses. The time constant of the circuit may be selected for a quicker change in the control signal for a given sample pulse rate. However, the relatively long time constant in the charging circuits for capacitor 62 provides immunity from oscillation and immunity from response to a sudden increase in signal strength caused by scene illumination and effectively serves to correct the average signal.

In the system shown in FIG. 1 the focus modulation was achieved by modulating the focus coil current and the focus correction was performed by altering the focus electrode potential. It is to be understood that if desired the focus modulation may be accomplished by impressing the modulation waveform on the focus electrode potential and the focus error correction may be performed by controlling the focus coil current.

Further, it is to be understood that the invention may be practiced by impressing both the modulation waveform and the control signal on the same focusing parameter, either the focus coil current or the focusing electrode potential. This is possible because the modulation is a relatively small amplitude modulation of the focus coil current or focusing electrode potential whereas the focus correction control signal is a relatively slowly changing parameter.

In the embodiment described the automatic beam focusing apparatus was incorporated in a single-tube television camera utilizing a striped spatial color encoding filter for encoding light as amplitude modulation of two relatively high-frequency carrier waves and their associated sidebands. The invention is useful in such a camera as it is necessary to accurately resolve the stripe encoding pattern on the photosensitive electrode of the image pickup device in order to produce uniform color signals having the desired resolution. However, the invention is useful in providing automatic beam focusing for all image pickup devices used in any monochrome or color television cameras utilizing one or more image pickup devices. In a more conventional-type camera, for example, the tuned amplifier 26 of FIG. 1 may be replaced by a high-pass filter and the relatively high-frequency video signal components will adequately serve as a signal from which the focus modulation may be detected.

In any camera embodying the invention the regulation requirements of the focusing voltage or current supplies are less critical since the automatic beam focusing arrangement compensates for variation of focusing voltage or current. Thus, less complex power supplies may be utilized, resulting in a cost saving.

What is claimed is:

1. Apparatus for automatically focusing an electron beam of an image pickup device, comprising:

an image pickup device including electromagnetic and electrostatic means for focusing an electron beam of said device;

means for modulating a beam-focusing parameter coupled to one of said electromagnetic and electrostatic means of said image pickup device;

means coupled to a signal output terminal of said image pickup device for detecting modulation components caused by said modulated focusing parameter;

means coupled to said detecting means for producing a control signal corresponding to the sense of said detected modulation components; and means responsive to said control signal for altering a focusing parameter coupled to the other of said electromagnetic and electrostatic means for focusing said beam.

2. Apparatus for automatically focusing an electron beam of an image pickup device according to claim 1 wherein said modulating means includes means for periodically amplitude modulating said focusing parameter.

3. Apparatus for automatically focusing an electron beam of an image pickup device according to claim 2 wherein said detecting means includes means for periodically sampling said detected modulation components at the same rate of said amplitude modulation.

4. Apparatus for automatically focusing an electron beam of an image pickup device according to claim 3 wherein said means for producing a control signal includes means responsive to the polarity of said sampled modulation components.

5. Apparatus for focusing an electron beam in an image pickup device, comprising:

an image pickup device including a focusing electrode to which is coupled a focusing potential;

electromagnetic focusing means encircling said pickup device to which a focusing current is coupled;

means for periodically modulating one of said focusing potential and current;

means for detecting modulation components obtained from a signal electrode of said pickup device;

means for producing a control signal from said detected modulation components representative of an out-of-focus state of said electron beam; and means responsive to said control signal for altering the other of said focusing current and potential for focusing said beam.

6. Apparatus for focusing an electron beam in an image pickup device, comprising:

an image pickup device including a signal producing electrode and a focusing electrode;

means for continuously modulating a potential coupled to said focusing electrode at a rate relatively slow compared to the field scanning rate of said image pickup device for varying the focus of said electron beam at said modulation rate;

means for deriving a signal from said signal producing electrode related to the focus condition of said electron beam;

means for producing a control signal from said focus condition related signal said control signal being varied at a rate relatively slow compared to said modulating rate; and means responsive to said control signal for altering said focus potential for focusing said electron beam.

7. Apparatus for focusing an electron beam in an image pickup device comprising:

an image pickup device including a signal producing electrode;

electromagnetic focusing means disposed around said image pickup device;

means for continuously modulating current coupled to said focusing means at a rate relatively slow compared to the field scanning rate of said image pickup device for varying the focus of said electron beam at said modulation rate;

means for deriving a signal from said signal producing electrode related to the focus condition of said electron beam;

means for producing a control signal from said focus condition related signal said control signal being varied at a rate relatively slow compared to said modulating rate; and means responsive to said control signal for altering said focus current for focusing said electron beam.

* * * * *